United States Patent [19]
Allen et al.

[11] Patent Number: 5,777,268
[45] Date of Patent: Jul. 7, 1998

[54] SPLICE CLOSURE FOR BURIED TELECOMMUNICATIONS CABLES

[75] Inventors: Barry Wayne Allen, Siler City; Terry Edward Frye, Gary, both of N.C.; Michael Earle Labonge, Orlando, Fla.; Linda Jones Joyner, Fuquay Varina, N.C.

[73] Assignee: Raychem Corporation, Menlo Park, Calif.

[21] Appl. No.: 718,081

[22] Filed: Sep. 17, 1996

Related U.S. Application Data

[60] Provisional application No. 60/805,072, Oct. 6, 1995.

[51] Int. Cl.⁶ .................................................. H02G 15/02
[52] U.S. Cl. .................... 174/74 A; 174/77 R; 174/79; 174/88 R; 174/93; 29/858
[58] Field of Search .................... 174/93, 77 R, 174/74 A, 74 R, 79, 82, 88 R; 29/857, 858, 868, 872

[56] References Cited

U.S. PATENT DOCUMENTS

| | | | |
|---|---|---|---|
| 3,585,275 | 6/1971 | Gillemot | 174/76 |
| 3,614,295 | 10/1971 | Gillemot | 174/87 |
| 3,806,630 | 4/1974 | Thompson te al. | 174/72 R |
| 4,070,543 | 1/1978 | Thompson et al. | 174/93 X |
| 4,079,193 | 3/1978 | Channell | 174/93 X |
| 4,332,975 | 6/1982 | Dienes | 174/77 R |
| 4,423,918 | 1/1984 | Filreis et al. | 339/97 P |
| 4,451,696 | 5/1984 | Beinhaur | 174/92 |
| 4,490,422 | 12/1984 | Pascher | 428/36 |
| 4,736,071 | 4/1988 | Hawkins et al. | 174/92 |
| 4,751,350 | 6/1988 | Eaton | 174/74 A |
| 4,927,984 | 5/1990 | Meislitzer et al. | 174/77 R |
| 5,059,748 | 10/1991 | Allen et al. | 174/87 |
| 5,149,281 | 9/1992 | Hills et al. | 439/521 |
| 5,371,323 | 12/1994 | Schneider et al. | 174/92 |
| 5,427,270 | 6/1995 | Patterson | 220/250 |

FOREIGN PATENT DOCUMENTS

| | | |
|---|---|---|
| WO 94/09533 | 4/1994 | WIPO . |
| WO 94/17572 | 8/1994 | WIPO . |

*Primary Examiner*—Hyung S. Sough
*Assistant Examiner*—Marc D. Machtinger
*Attorney, Agent, or Firm*—Herbert G. Burkard

[57] ABSTRACT

An environmentally sealed splice closure (20) for buried telecommunications cables (32) and splices (33) includes a base (22a and b) having ports (31a and b) for receiving the telecommunications cables (32) therethrough. A cap (25) is received on the base (22) to form a cavity (50) within the splice closure (20). The cavity (50) is filled with a gel sealant (45 and 47). A dome (55) on the end of the cap (25) opposite the base (22) accommodates volumetric and pressure changes within the closure (20).

24 Claims, 10 Drawing Sheets

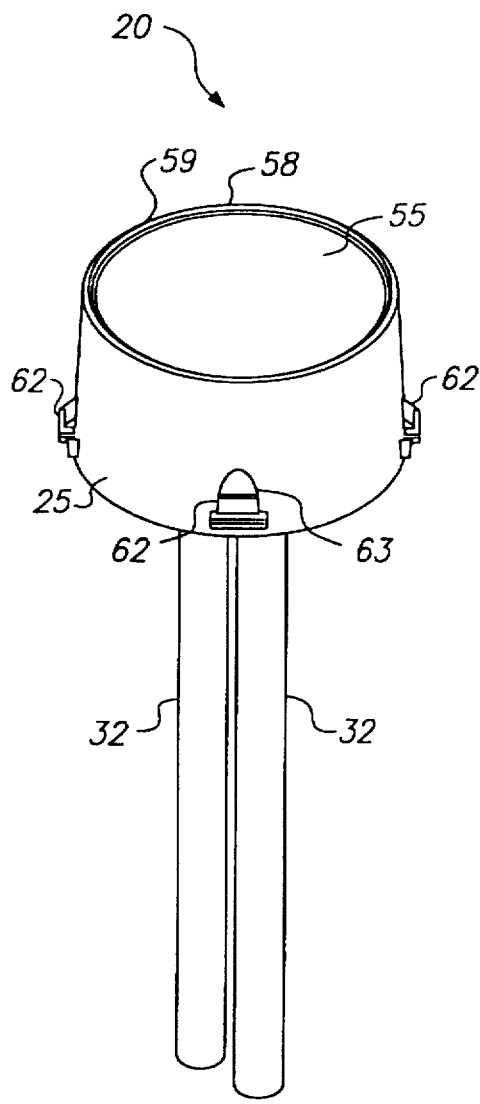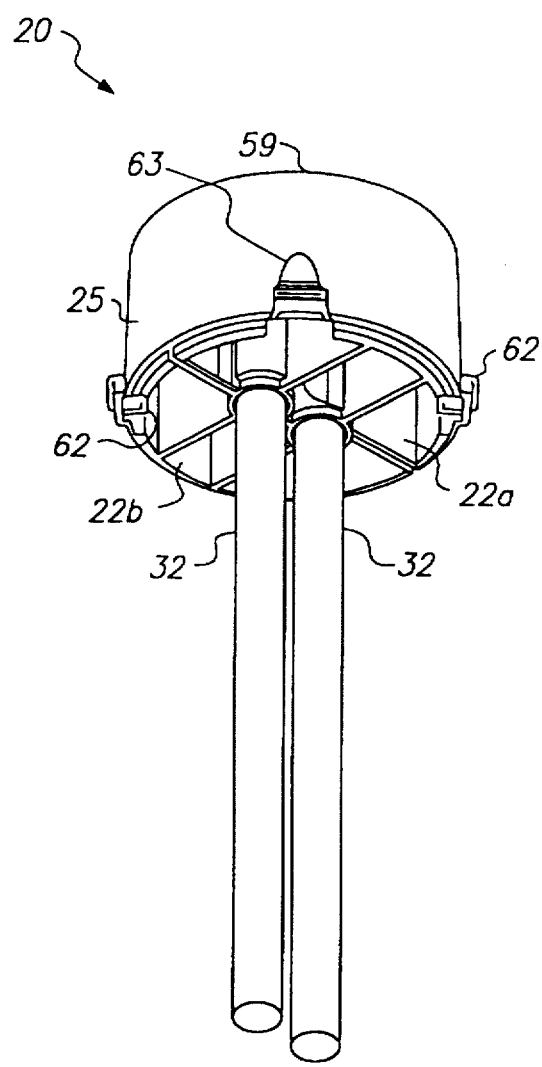
FIG. 1a
FIG 1b

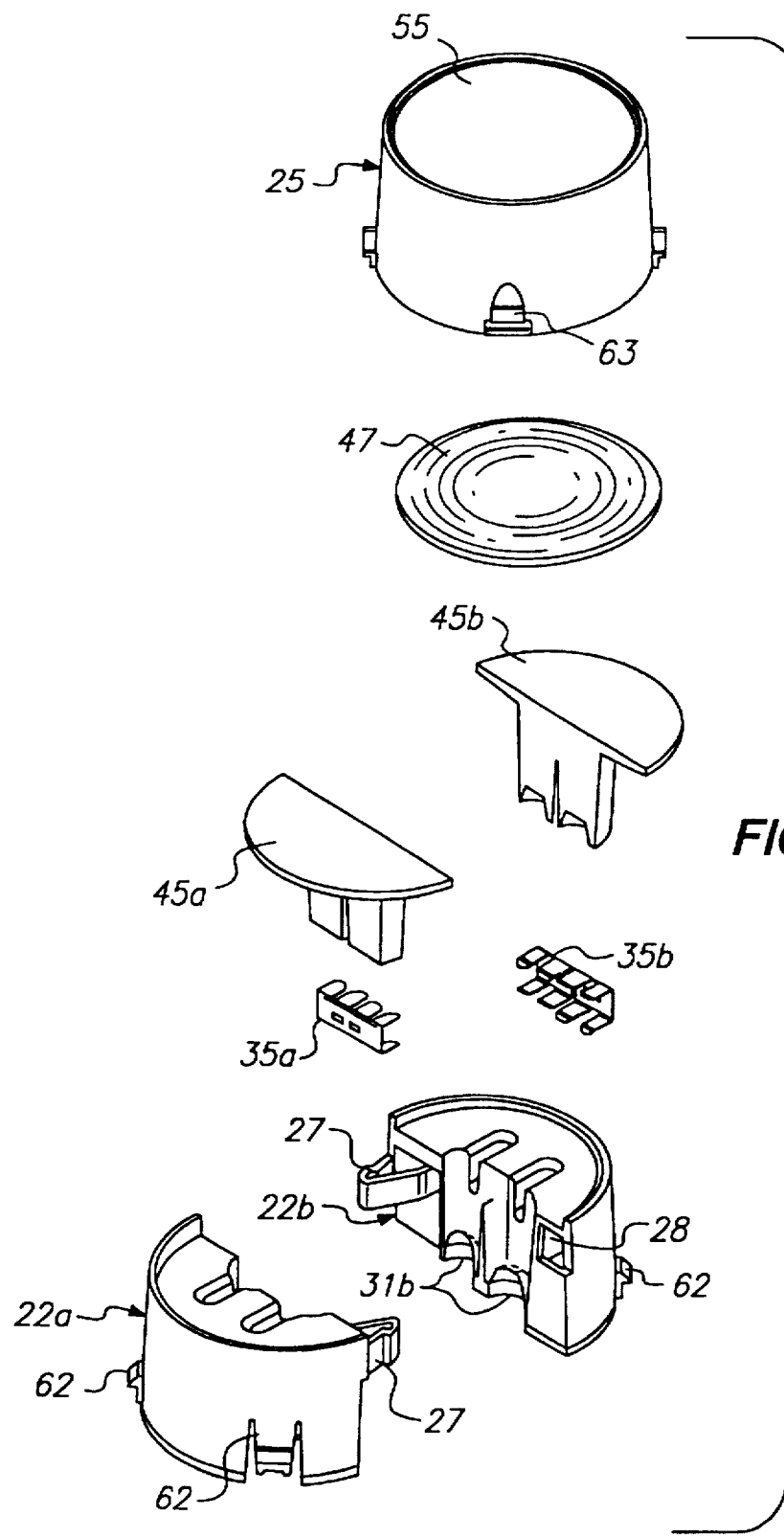

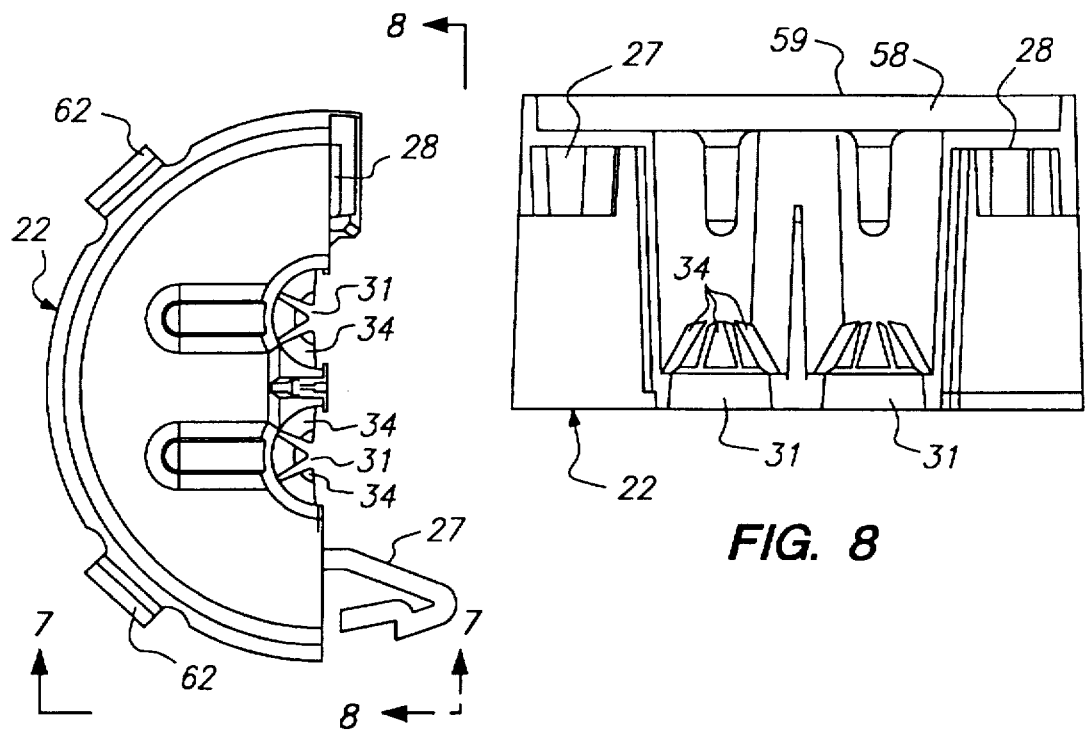
FIG. 6
FIG. 8
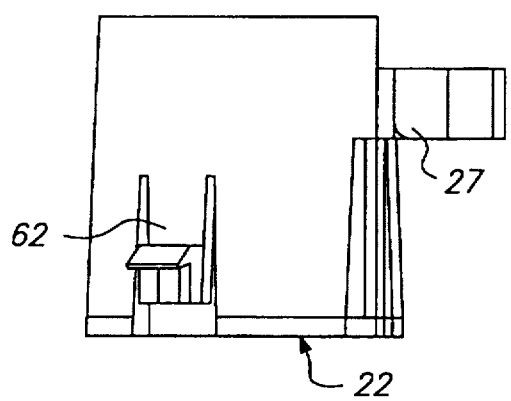
FIG. 7
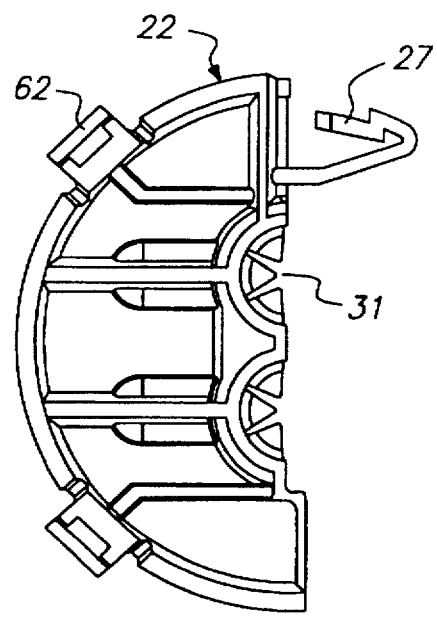
FIG. 9

SPLICE CLOSURE FOR BURIED TELECOMMUNICATIONS CABLES

CROSS-REFERENCE TO RELATED APPLICATIONS

This application claims the benefit of U.S. Provisional Application Ser. No. 60/005,072, filed Oct. 6, 1995, now abandoned.

BACKGROUND OF THE INVENTION

The present invention relates to splice closures, and more particularly to an environmentally sealed splice closure for telecommunications cables which achieves a reliable and long-lasting environmental seal after easy installation which does not require the use of heat. The invention is particularly suited for use with buried cables, service wires, and their associated splices, including situations where it may be desirable to re-enter the closure to re-access the splices.

Environmentally protecting telecommunications splices is an age old problem. In essence, the challenge has been to isolate the splice from any material which might degrade the quality thereof, such materials including oxygen, water, salts, and so forth. From a theoretical standpoint, this is not that difficult: simply build a fortress around the splice sufficient to keep all these contaminants out. From a commercial standpoint, however, there is a continuing need for splice closures which are extremely easy to use, extremely effective in excluding contaminants, and extremely economical.

In recent years, significant advances have been afforded through the use of gel sealant materials. The adhesive properties of such gels readily seal the gels to the substrates which are to be protected, and preclude access thereto of contaminants. The resiliency of the gels allows them to conform to even very complex geometric requirements, and because the gels do not harden over time, they can accommodate later configurational changes if prior provision is made therefor. Gels have proven particularly useful and valuable where electrical contacts and/or splices may need to be subsequently reentered. This technology has thus significantly improved performance while also significantly reducing costs and complexity.

However, there still remains room for important improvements. For example, more and more utility services are being installed under rather than above ground. In the telecommunications industry, splices to those cables must be protected very reliably, yet, in the interest of economy, the protection should be afforded quickly, conveniently, and inexpensively. A closure for containing and protecting such splices should therefore be as close to self-installing as possible. It should also be versatile, since the number of splices to be accommodated can vary significantly (typically, from perhaps four connections to as many as twelve or more). Changes in ambient conditions (principally temperature and immersion waterhead pressure) should also be accommodated. Easy reentry should also be afforded in case it is subsequently needed.

A need therefore remains for improved methods and apparatus for environmentally sealing telecommunications cable splices in underground environments, and particularly for providing reliable cold-sealed closures for splices which may be buried.

SUMMARY OF THE INVENTION

Briefly, the present invention meets the above needs and purposes with a new and improved environmentally sealed splice closure for buried telecommunications cables (including copper wire cables, coaxial cables, fiber optic cables, and so forth), achieving a reliable and long-lasting environmental seal without the use of heat or toxic chemicals. The closure is readily and easily assembled from just three pieces: a two-part base and a cap. Essentially, after these splices are completed, the two halves of the base are snapped together around two cables, the splices are arranged around the upper surfaces of the complementary gel plugs in the base, and the cap is snapped onto the base. The enclosure is then placed in its underground location (direct buried or inside another enclosure), and the work is complete.

To achieve such convenience, the present invention includes a pair of ports in the base which are dimensioned to fit closely the cables which are to be passed therethrough. In the preferred embodiment, the ports are partially closed by flexible tongs or fingers which produce an aperture effect for accommodating different cable sizes. Each base portion also includes a clip for engaging and retaining the cables, the clips having fingers between which the cables are received, and tips on the fingers so that they can slide over one another to interdigitate as the base halves are brought together. Above the ports are two complementary gel portions which seal around the cables to form a moisture block when the base sections are snapped together. The complementary cap contains a third gel portion, the volume of which, when added to the two gel portions in the base fills the cavity defined by the assembled cap and base. The splices themselves are thus completely engulfed in the gel between the cap portion and the base portions.

To accommodate internal and external volumetric and pressure changes for the essentially closed cavity of the splice closure, the top of the cap, opposite the base, has a flexible dome bladder. The dome is initially (prior to assembly) outwardly concave, and then subsequently bulges upwardly or outwardly according to the additional volume engulfed in the cavity resulting from the cables and splices enclosed therein. Subsequently, the dome will also flex in response to changes in the pressure of the sealant, such as resulting from thermal expansion and contraction. A principal feature of the present invention is that the dome is formed of a suitable plastic material which relaxes substantially non-resiliently over time, to return the pressure of the sealant within the closure cavity to ambient pressure, and to accommodate and equilibrate changes in ambient pressure. This has several advantages. For example, significant differences in the volume of cables and splices can be readily accommodated without the need to expel excess gel, nor the need to maintain a pressure or energy storing device, or a constant pressure, independent of significant volume variations. Instead, environmental sealing is based upon the adhesive properties of the gel rather than compression of the gel. Another advantage, which results from reliance upon the adhesion of the gel, is that it is unnecessary to assure performance of a pressure or energy-storing device over a period of years. Rather, the present invention engulfs the cables and splices in a sufficient quantity of gel, provides compensation for volumetric and pressure variations as described above, and assures that the gel is maintained substantially at ambient pressure over time, to achieve a reliable, long-term environmental seal.

It is therefore an object of the present invention to provide new and improved methods and apparatus for environmentally sealed splice closures for all types of telecommunications cables; such methods and apparatus which provide and utilize an environmentally sealed splice closure for buried telecommunications cables, the closure including a base having port means defining at least one entry port for receiving at least one telecommunications cable therethrough, a cap having at least one wall and being receivable on the base opposite the port means to complement the base to form therewith a cavity within the splice closure, the base, port means, and cap being dimensioned such that the cavity is substantially isolated from the exterior of the closure when the entry port means is blocked by one or more cables passing therethrough, a predetermined volume of sealant substantially filling the cavity, and volumetric and pressure accommodation means in the closure to compensate automatically for variations i) in the volume of cables and splices installed into the closure to assure that the sealant continues to substantially fill the cavity, and ii) in the pressure of sealant resulting from thermal expansion and contraction thereof and from external pressure changes to assure that the sealant continues to substantially fill the cavity substantially at ambient pressure, to achieve a reliable and long-lasting environmental seal for cables and splices therewithin; in which the volumetric and pressure accommodation means may be a flexible bladder which relaxes substantially non-resiliently; in which the bladder may be a dome in the splice closure; in which the dome may be integral with a wall of the cap; which may include a protector ring having an outer rim, the ring projecting outwardly from the exterior of the cap substantially opposite the base, and in which the dome is substantially within and below the rim of the protector ring to protect the dome at least during assembly of the cap onto the base; in which the protector ring may be substantially circular; in which the dome may be outwardly concave prior to assembly of the cap onto the base; in which the sealant may be a gel suitable for environmentally sealing telecommunications connections; in which each portion of the base and cap may include a complementary respective portion of the gel, between which gel portions cables and splices may be accommodated when the closure is assembled therearound, to effect an environmental water block to protect such splices; which may include at least one clip on the base at the port means for engaging and retaining cables passing therethrough, the clip having a plurality of fingers for receiving at least one such cable therebetween, tips on the fingers configured to interdigitate with another such clip when opposed closely thereto, and flex means to facilitate receiving a cable between the fingers by providing for the fingers to resiliently bend away from one another; which may include means for expelling substantially all air and/or moisture from the cavity during assembly of the cap onto the base; and to accomplish the above objects and purposes in an inexpensive, uncomplicated, durable, versatile, and reliable method and apparatus, inexpensive to manufacture, and readily suited to the widest possible utilization in environmentally sealing buried cables, service wires, and their associated splices.

These and other objects and advantages of the invention will be apparent from the following description, the accompanying drawings, and the appended claims.

BRIEF DESCRIPTION OF THE DRAWINGS

FIGS. 1a and 1b are upper and lower perspective views of an assembled closure according to the present invention;

FIG. 4b is a fully exploded view of the closure;

FIG. 6 is a top plan view of a base portion;

FIG. 7 is an elevational view of the FIG. 6 base portion taken on view line 7—7 in FIG. 6;

FIG. 8 is an elevational view of the FIG. 6 base portion taken on view line 8—8 in FIG. 6;

FIG. 9 is a bottom view of the base portion shown in FIG. 6;

DESCRIPTION OF THE PREFERRED EMBODIMENTS

Figure 2:
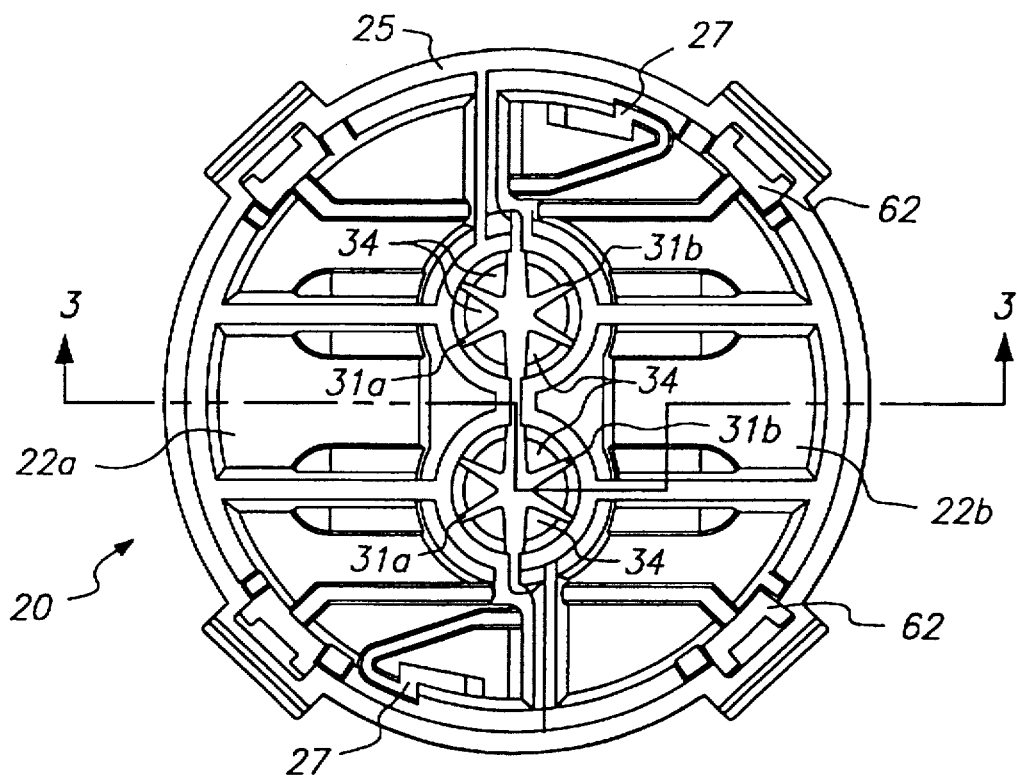
FIG. 2 is a bottom view of the FIG. 1 closure.

With reference to the drawings, the new and improved environmentally sealed splice closure 20 for telecommunications cables, and the method for environmentally sealing buried telecommunications cables and splices according to the present invention, will now be described. FIG. 1 shows the splice closure 20, comprised of a two-part base 22a and 22b, and a cap 25. Base parts 22, in the preferred embodiment, are identical and are configured to join in complementary fashion when juxtaposed face-to-face. This is facilitated by locking pins 27 which are received in respective slots 28 to snap the base halves 22 together.

On the bottoms of the base halves are pairs of empty ports 31a and b for receiving cables 32 therethrough. The conductors within cables 32 are electrically and mechanically coupled in standard fashion by splices 33. Ports 31 are partially closed by flexible tongs or fingers 34 which produce an aperture effect for accommodating different cable sizes.

Supported adjacent ports 31 are clips 35a and b having fingers 36 which form slots 37 therebetween, into which the cables are received. The sides of the fingers are serrated to grip the cables. The fingertips 39 are bent slightly upwardly on one pair and slightly downwardly on the mirror-image pair to configure them to complement each other for convenient interdigitation when opposed as the base halves 22 are snapped together. Cables 32 are accommodated easily in the clip slots 37 by the provision of flex means 41 which allows the fingers easily to resiliently bend away from one another to widen slot 37. In the preferred embodiment, flex means 41 is a hole in the back portion of the clip bridging the fingers on each side of a corresponding slot 37 so that the material in that region is reduced, thus allowing it to flex more easily.

Each base half portion 22a or 22b has a respective gel portion 45a or 45b, and, as shown, these meet face-to-face with the cables 32 passing herebetween into the upper portion (cap 25) of the splice closure 20. The gel base portions 22 thus provide a very effective environmental water block to protect the splices 33. The gel may be any gel suitable for environmentally sealing telecommunications connections, as is known in the art.

Figure 3:
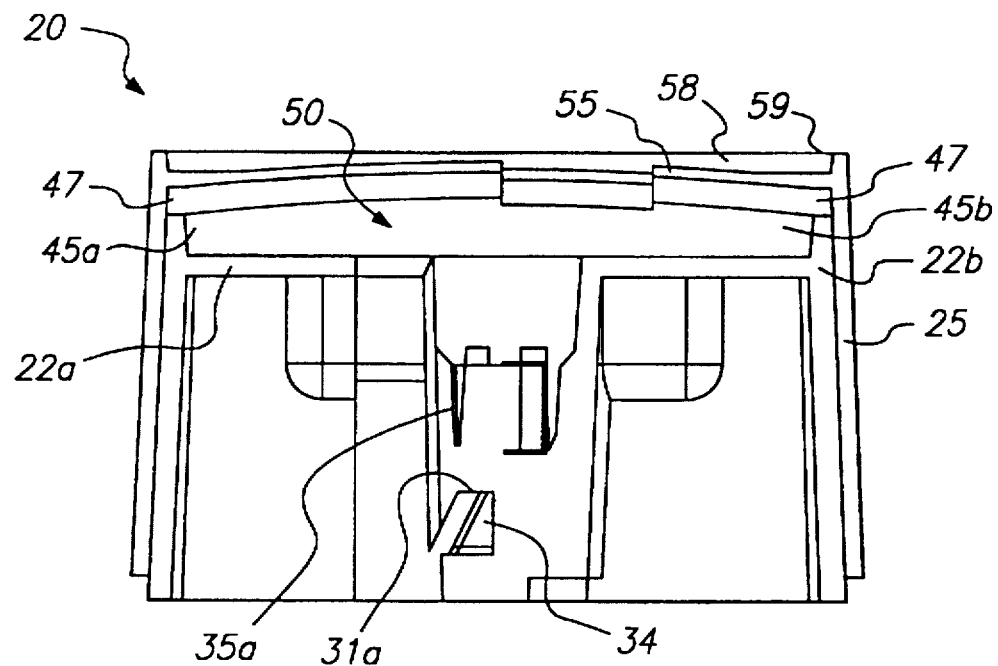
FIG. 3 is a cross-sectional view of the closure, taken generally on line 3—3 in FIG.2.
Figure 4A:
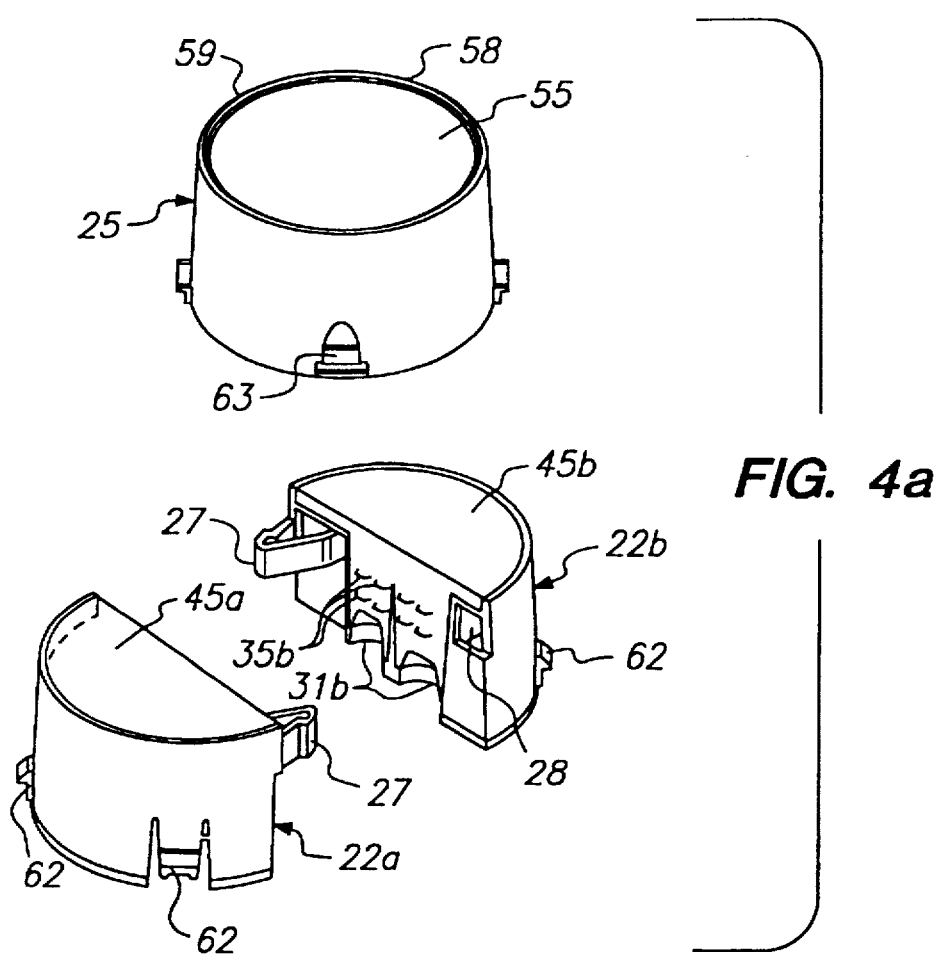
FIG. 4a is a partially exploded view of the closure.
Figure 5A:
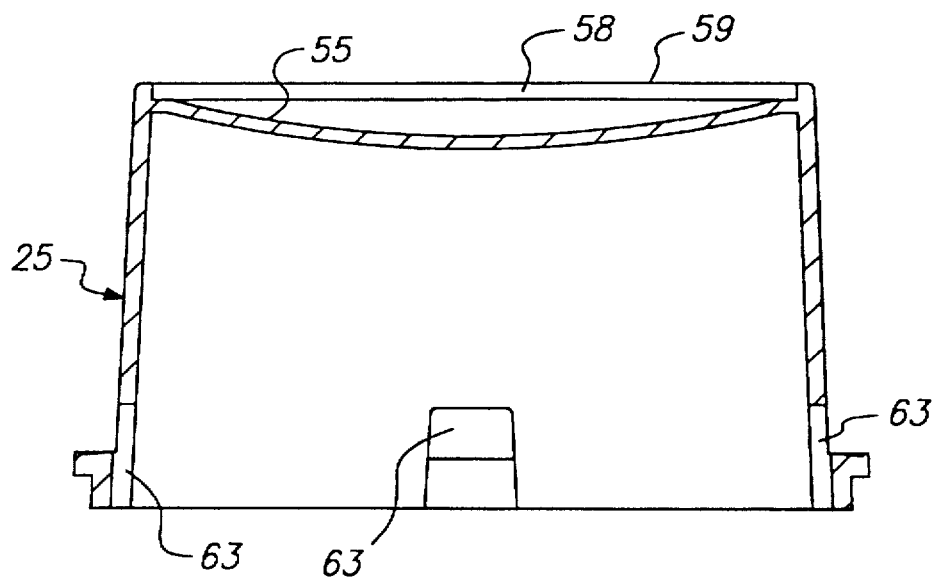
FIG. 5a illustrates the dome in the closure cap before assembly.
Figure 5B:
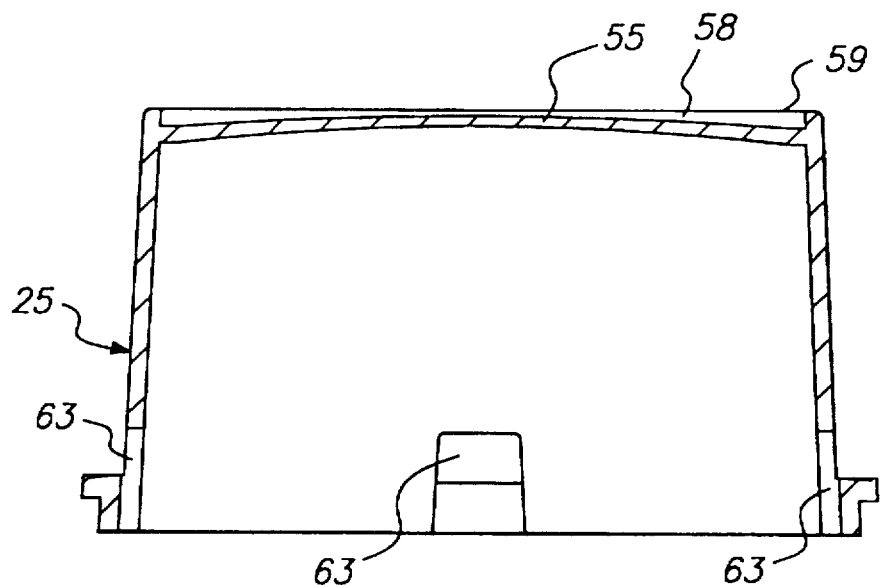
FIG. 5b illustrates the dome in the closure cap after assembly, showing flexure to accommodate material volumes therewithin.
Figure 10:
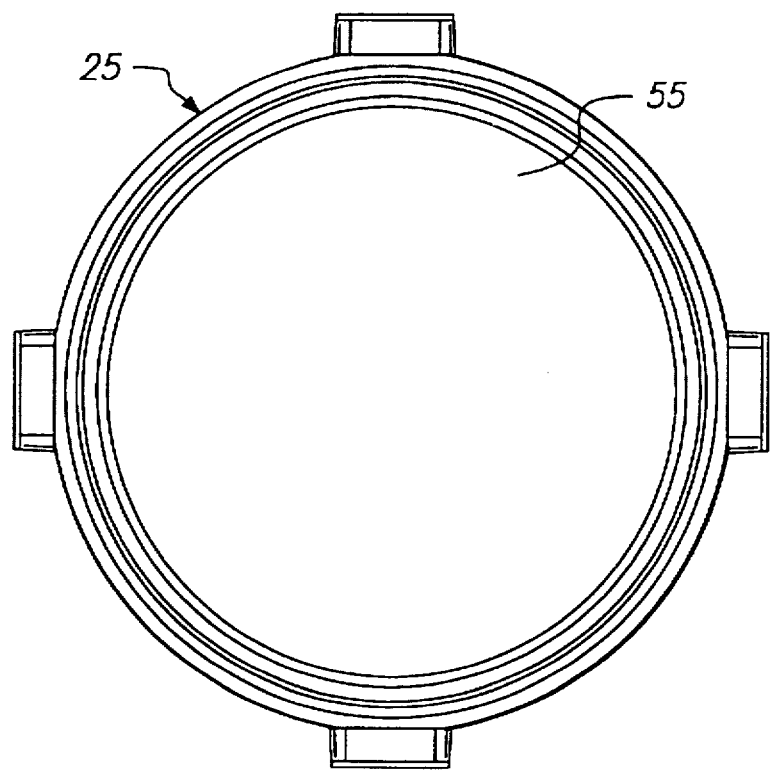
FIG. 10 is a plan view of the cap.
Figure 11:
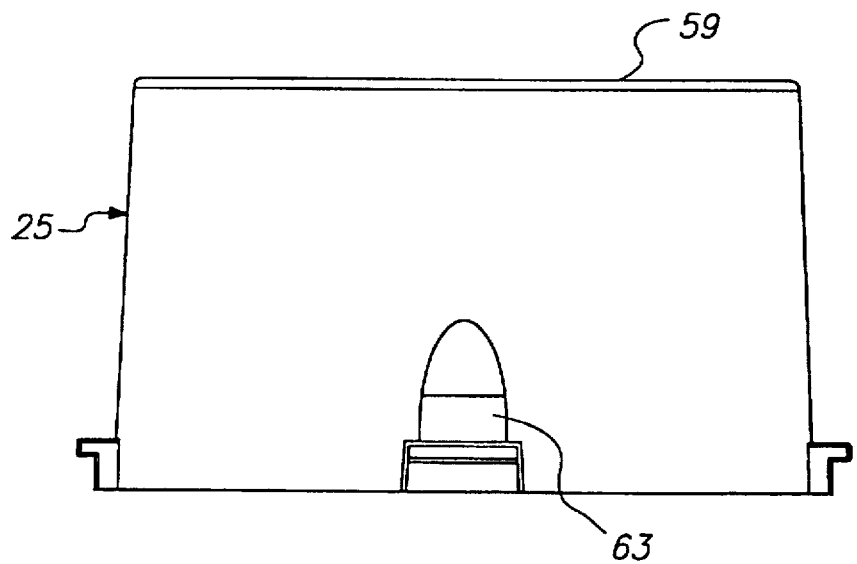
FIG. 11 is an elevational view of the cap.
Figure 12:
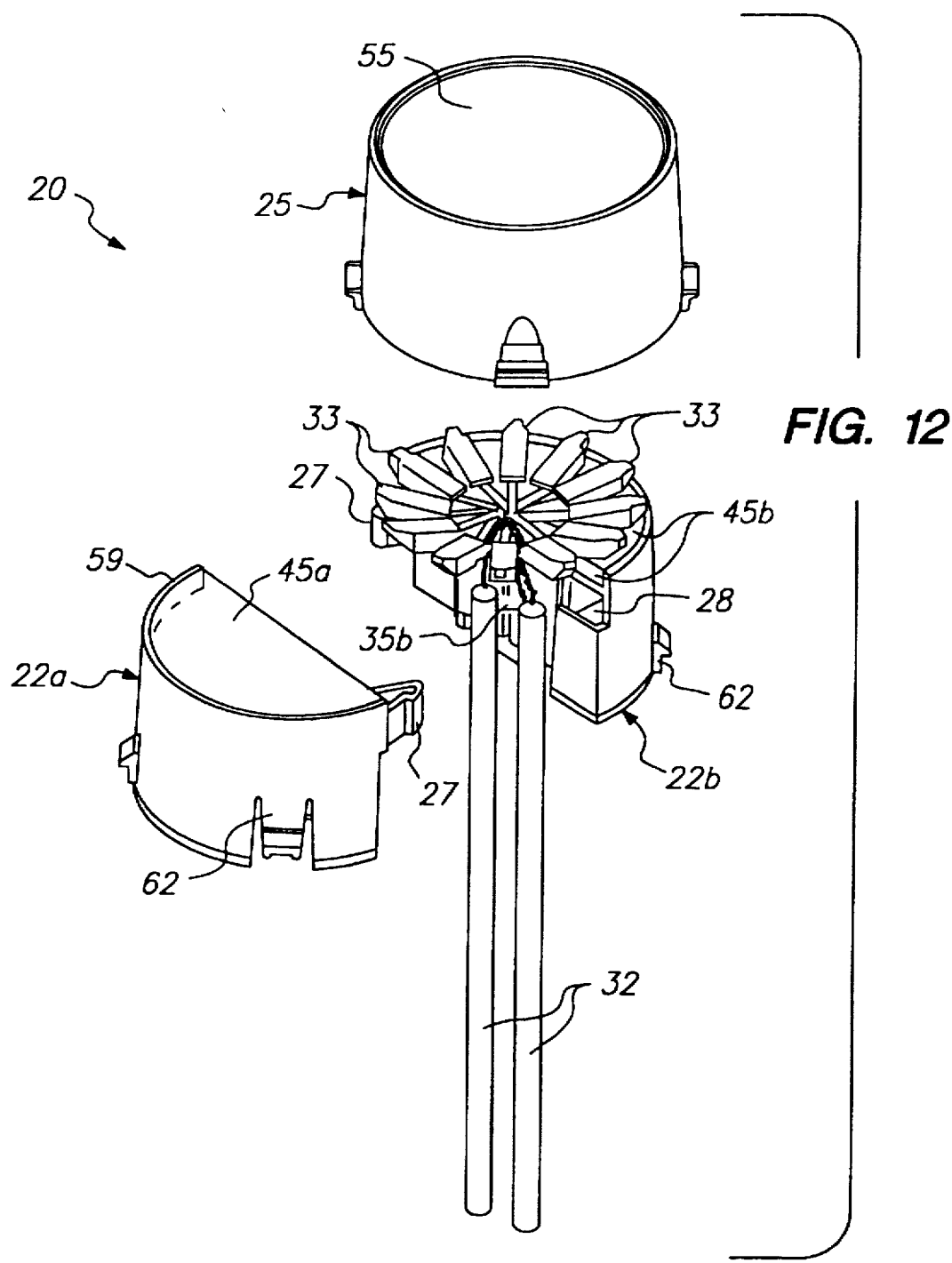
FIG. 12 is a partially exploded view showing a preferred arrangement for the splices.
Figure 13A:
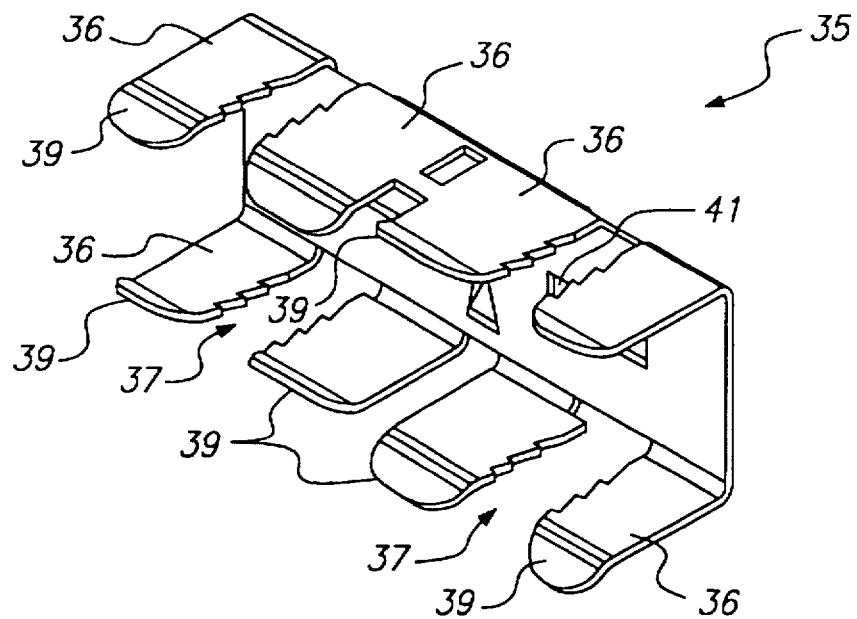
FIG. 13a is a perspective view of the clip.
Figure 13B:
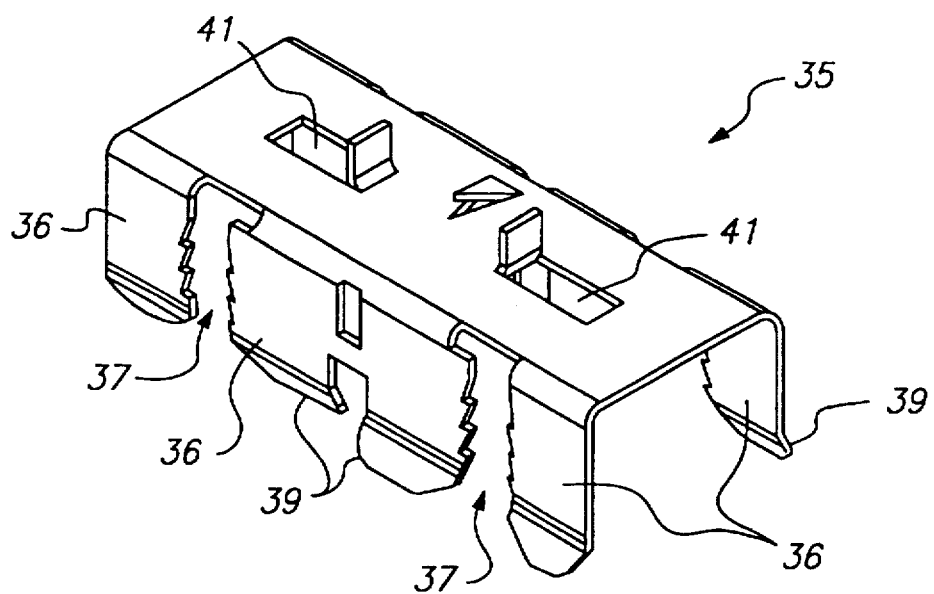
FIG. 13b is a perspective view of the clip opposite that shown in FIG. 12.
Figure 14A:
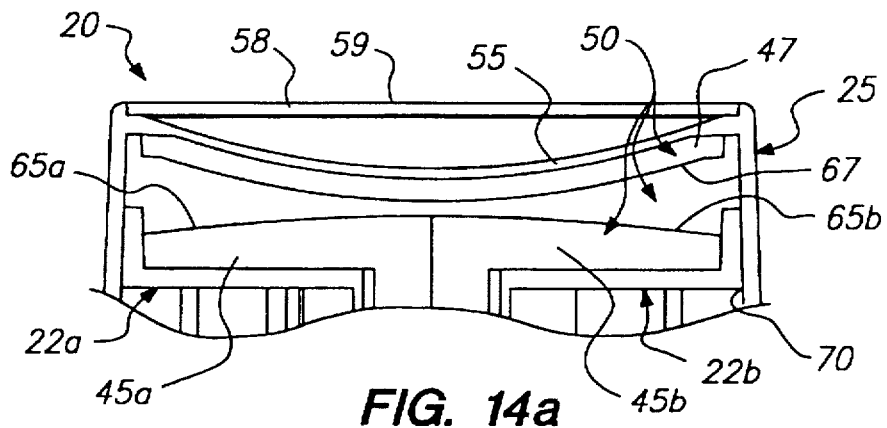
FIGS. 14a–14d illustrate progressive expulsion of air from between the gel portions during assembly of the cap onto the base.
Figure 14B:
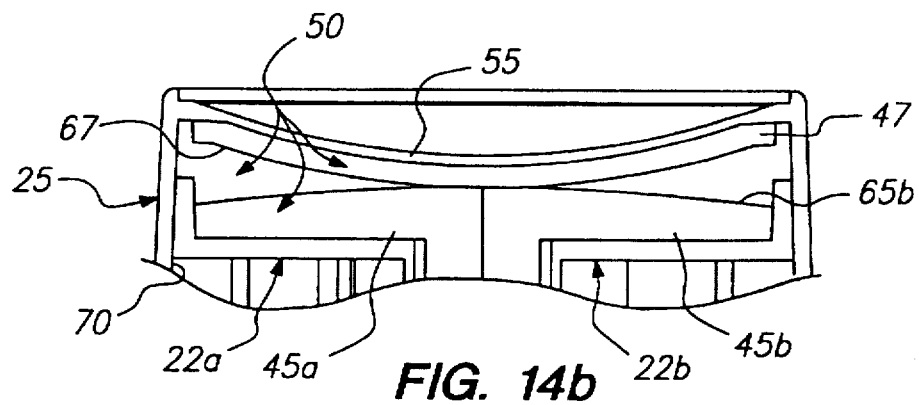
Figure 14C:
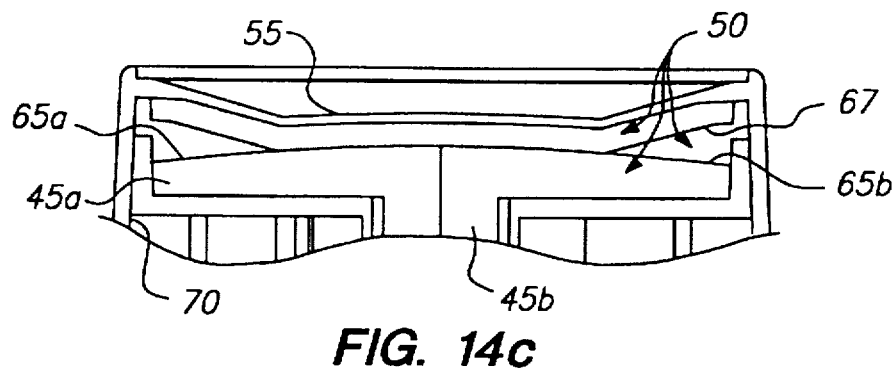
Figure 14D:
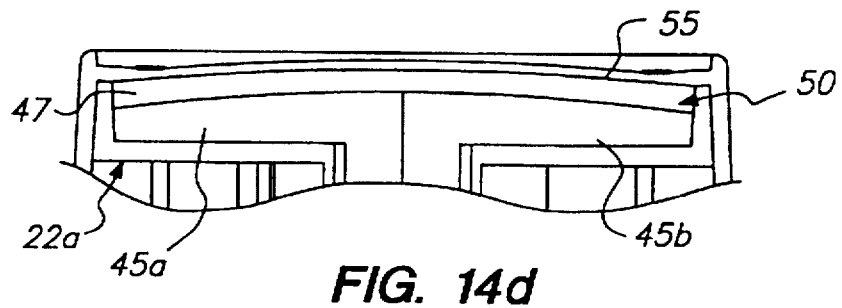

The splice closure cap 25 contains a third gel portion 47 which, in combination with the volumes of the gel base portions 45a and b, amounts to a volume of gel sealant which substantially fills the cavity 50 (FIG. 3) which is formed within the cap and base when assembled together. Preferably, the splices 33 are arranged on top of the gel base portions 45a and b, spaced from each other as illustrated in FIG. 12, and then individually completely engulfed in gel between the gel base portions 45a and b and the gel cap portion 47 when the cap is assembled onto the base.

To accommodate variations in the volumes of cables and splices and variations in the gel volume resulting from thermal expansion and contraction, the top of the cap 25 is formed as a flexible dome-shaped bladder 55 which is integral with the top wall of the cap. Dome 55 is initially outwardly concave, and, depending upon the volume displacement which needs to be accommodated during assembly, will be pushed outwardly somewhat from that initial shape. (It may even become convex.) At least the dome 55 is fabricated from a suitable material such as polypropylene which relaxes substantially non-resiliently so that the pressure within cavity 50 is restored to and maintained at the external ambient pressure. The dome 55 is thus a pseudo-piston to transmit external pressure (e.g., an external water head) to the interior of the closure 20, so that there is less incentive for water to leak into the closure.

FIGS. 14a–14d illustrate progressive expulsion of air from between the gel portions during assembly of the cap onto the base. As can be seen (FIG. 14a), the top profiles 65a and 65b of the gel base portions 45a and 45b do not match the profile 67 of the gel cap portion 47. Instead, the profiles are shaped to cause the gel portions 65 and 67 to contact each other initially at the center. Then, as the closure cap 25 continues to be assembled onto the base 22, the contact between the gel portions 65 and 67 moves progressively outward, as shown sequentially in FIGS. 14b–14d. This expels substantially all trapped air and/or moisture out of cavity 50 through the fine perimeter gap 70 where the base 22 and cap 25 meet.

In the preferred embodiment, the dome 55 is surrounded by a protector ring 58 having an outer rim 59. The protector ring projects outwardly from the exterior of the cap substantially opposite the base 22, and the dome 55 is substantially within and below the outer rim 59. In this fashion, the dome can be protected during assembly of the cap onto the base, such as by inverting the closure to press the base into the cap. In some situations, protector ring 58 will also afford protection for the dome 59 after installation below ground. Base 22 is held on cap 25 (and vice versa) by base snap fingers 62 which are received in cap finger slots 63 when thus assembled.

As may be seen, therefore, the present invention provides numerous advantages. Principally, as tests have shown, it affords a convenient, inexpensive, highly reliable and efficient splice closure for buried telecommunications cables. As will now be appreciated, the present invention can be assembled quickly, usually in but a few minutes, regardless of whether a few splices or many splices are to be enclosed, and without concern for the precise volume of the cables within the closure. No special tools are required, although, if desired, assembly and disassembly may be facilitated by a suitably shaped pry-bar (not shown) to reduce the manual force needed. No heat or toxic chemicals are required. No time is required for materials to solidify or set. With cables installed through and thus blocking the base ports, the cavity within the closure is substantially isolated from the exterior of the closure.

Another advantage of the present invention is that it can be easily re-entered if it becomes necessary or desirable to re-access the cables and/or splices therein. The closure snaps are simply released, which can easily be done manually or with a suitable pry-bar (e.g., a screwdriver), and immediate access is afforded. When reassembled, full environmental protection is immediately restored.

Of course, various modifications to the present invention will occur to those skilled in the art upon reading the present disclosure. For example, a bladder other than a dome on the end of the cap may be employed, as desired. Additional cable ports may be provided. A screen or shield may be added to the protector ring over the dome to reduce exposure of the dome to solid objects after the closure is buried.

Claim dependencies have been drafted to comply with PCT Rule 6.4, but it will be understood that, at least by virtue of this paragraph, any appropriate combination of the features disclosed and/or claimed herein is in itself an embodiment of the invention, and it is intended to use multiple dependent claims in the national phase where permitted.

Therefore, while the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. An environmentally sealed splice closure for buried telecommunications cables, comprising:
   a) a base having port means defining at least one entry port for receiving at least one telecommunications cable therethrough,
   b) a cap having at least one wall and being receivable on said base opposite said port means to complement said base to form therewith a cavity within said splice closure,
   c) said base, port means, and cap being dimensioned such that said cavity is substantially isolated from the exterior of said closure when said entry port is blocked by one or more cables passing therethrough,
   d) a predetermined volume of sealant substantially filling said cavity, and
   e) volumetric and pressure accommodation means in said closure to compensate automatically for variations:
      i) in the volume of cables and splices installed into said closure to assure that said sealant continues to substantially fill said cavity, and
      ii) in the pressure of said sealant resulting from thermal expansion and contraction thereof and from external pressure changes to assure that said sealant continues to substantially fill said cavity substantially at ambient pressure,
   while maintaining said sealant substantially within said cavity to achieve a reliable and long-lasting environmental seal for cables and splices therewithin.

2. The splice closure of claim 1 wherein said volumetric and pressure accommodation means further comprises a flexible bladder which relaxes substantially non-resiliently.

3. The splice closure of claim 2 wherein said bladder further comprises a dome in said splice closure.

4. The splice closure of claim 3 wherein said dome is integral with a wall of said cap.

5. The splice closure of claim 4 further comprising a protector ring having an outer rim, said ring projecting outwardly from the exterior of said cap substantially opposite said base, and wherein said dome is substantially within and below the rim of said protector ring to protect said dome at least during assembly of said cap onto said base.

6. The splice closure of claim 5 wherein said protector ring is substantially circular.

7. The splice closure of claim 5 wherein said dome is outwardly concave prior to assembly of said cap onto said base.

8. The splice closure of claim 1 wherein said sealant is a gel suitable for environmentally sealing telecommunications connections.

9. The splice closure of claim 8 wherein each portion of said base and cap includes a complementary respective portion of said gel, between which gel portions cables and splices are accommodated when said closure is assembled therearound, to effect an environmental water block to protect such splices.

10. The splice closure of claim 1 further comprising at least one clip on said base at said port means for engaging and retaining cables passing therethrough, said clip having:
   a) a plurality of fingers for receiving at least one such cable therebetween,
   b) tips on said fingers configured to interdigitate with another such clip when opposed closely thereto, and
   c) flex means to facilitate receiving a cable between said fingers by providing for said fingers to resiliently bend away from one another.

11. The splice closure of claim 1 wherein said predetermined volume of sealant further comprises means for expelling substantially all air and/or moisture from said cavity during assembly of said cap onto said base.

12. An environmentally sealed splice closure for buried telecommunications cables, comprising:
   a) a base having port means defining at least one entry port for receiving at least one telecommunications cable therethrough,
   b) a cap having at least one wall and being receivable on said base opposite said port means to complement said base to form therewith a cavity within said splice closure,
   c) said base, port means, and cap being dimensioned such that said cavity is substantially isolated from the exterior of said closure when said entry port is blocked by one or more cables passing therethrough,
   d) a predetermined volume of sealant substantially filling said cavity, said sealant being a gel suitable for environmentally sealing telecommunications connections, each portion of said base and cap including a complementary respective portion of said gel, between which gel portions cables and splices are accommodated when said closure is assembled therearound, to effect an environmental water block to protect such splices, said sealant including means for expelling substantially all air and/or moisture from said cavity during assembly of said cap onto said base,
   e) a flexible volumetric and pressure accommodation dome which is integral with a wall of said cap, is outwardly concave prior to assembly of said cap onto said base, and relaxes substantially non-resiliently, to compensate automatically for variations:
      i) in the volume of cables and splices installed into said closure to assure that said sealant continues to substantially fill said cavity, and
      ii) in the pressure of said sealant resulting from thermal expansion and contraction thereof and from external pressure changes to assure that said sealant continues to substantially fill said cavity substantially at ambient pressure,
   while maintaining said sealant substantially within said cavity,
   f) a substantially circular protector ring having an outer rim, said ring projecting outwardly from the exterior of said cap substantially opposite said base, and wherein said dome is substantially within and below the rim of said protector ring to protect said dome at least during assembly of said cap onto said base, and
   g) at least one clip on said base at said port means for engaging and retaining cables passing therethrough, said clip having:
      i) a plurality of fingers for receiving at least one such cable therebetween,
      ii) tips on said fingers configured to interdigitate with another such clip when opposed closely thereto, and
      iii) flex means to facilitate receiving a cable between said fingers by providing for said fingers to resiliently bend away from one another, to achieve a reliable and long-lasting environmental seal for cables and splices therewithin.

13. A method for environmentally sealing, buried telecommunications cables and splices, comprising:
   a) enclosing such cables and splices in a cavity within a splice closure, the closure having a base, port means in the base defining at least one entry port for receiving at least one telecommunications cable therethrough, a cap having at least one wall and being receivable on the base opposite the port means to complement the base to form the cavity within the splice closure, the base, port means, and cap being dimensioned such that the cavity is substantially isolated from the exterior of the closure when the entry port is blocked by one or more cables passing therethrough,
   b) substantially filling the cavity with a predetermined volume of sealant, and
   c) compensating automatically for variations:
      i) in the volume of cables and splices installed into the closure to assure that the sealant continues to substantially fill the cavity, and
      ii) in the pressure of said sealant resulting from thermal expansion and contraction thereof and from external pressure changes to assure that the sealant continues to substantially fill the cavity substantially at ambient pressure,
   while maintaining said sealant substantially within said cavity to achieve a reliable and long-lasting environmental seal for buried telecommunications cables and splices.

14. The method of claim 13 wherein said compensating step further comprises relaxing a flexible bladder substantially non-resiliently.

15. The method of claim 14 wherein said compensating step further comprises relaxing a bladder in the form of a dome in the splice closure.

16. The method of claim 15 wherein said compensating step further comprises relaxing a dome which is integral with a wall of the cap.

17. The method of claim 16 further comprising protecting the dome at least during assembly of the cap onto the base with a protector ring having an outer rim which projects outwardly from the exterior of the cap substantially opposite the base, and wherein the dome is substantially within and below the rim of the protector ring.

18. The method of claim 17 further comprising protecting the dome with a protector ring which is substantially circular.

19. The method of claim 17 wherein said compensating step further comprises relaxing a dome which is outwardly concave prior to assembly of the cap onto the base.

20. The method of claim 13 wherein said filling step further comprises filling the cavity with a gel sealant which is suitable for environmentally sealing telecommunications connections.

21. The method of claim 20 wherein said filling step further comprises filling each portion of the base and cap with complementary respective portions of the gel, between which gel portions cables and splices are accommodated when the closure is assembled therearound, to effect an environmental water block to protect such splices.

22. The method of claim 13 further comprising engaging and retaining cables passing through the base with at least one clip on the base at the port means, the clip having:

a) a plurality of fingers for receiving at least one such cable therebetween, b) tips on the fingers configured to interdigitate with another such clip when opposed closely thereto, and c) flex means to facilitate receiving a cable between the fingers by providing for the fingers to resiliently bend away from one another.

23. The method of claim 13 further comprising expelling substantially all air and/or moisture from the cavity during assembly of the cap onto the base.

24. A method for environmentally sealing buried telecommunications cables and splices, comprising:

a) enclosing such cables and splices in a cavity within a splice closure, the closure having a base, port means in the base defining at least one entry port for receiving at least one telecommunications cable therethrough, a cap having at least one wall and being receivable on the base opposite the port means to complement the base to form the cavity within the splice closure, the base, port, and cap being dimensioned such that the cavity is substantially isolated from the exterior of the closure when the entry port means is blocked by one or more cables passing therethrough, b) substantially filling each portion of the base and cap with complementary respective predetermined volumes of a gel sealant which is suitable for environmentally sealing telecommunications connections, between which gel volumes cables and splices are accommodated when the closure is assembled therearound, to effect an environmental water block to protect such splices.

c) expelling substantially all air and/or moisture from the cavity during assembly of the cap onto the base.

d) by non-resiliently relaxing a flexible dome which is integral with a wall of the cap and is outwardly concave prior to assembly of the cap onto the base, compensating automatically for variations:

i) in the volume of cables and splices installed into the closure to assure that the sealant continues to substantially fill the cavity, and ii) in the pressure of said sealant resulting from thermal expansion and contraction thereof and from external pressure changes to assure that the sealant continues to substantially fill the cavity substantially at ambient pressure, while maintaining said sealant substantially within said cavity, e) protecting the dome at least during assembly of the cap onto the base with a substantially circular protector ring having an outer rim, which projects outwardly from the exterior of the cap substantially opposite the base, the dome being substantially within and below the rim of the protector ring, and f) engaging and retaining cables passing through the base with at least one clip on the base at the port means, the clip having:

i) a plurality of fingers for receiving at least one such cable therebetween, ii) tips on the fingers configured to interdigitate with another such clip when opposed closely thereto, and iii) flex means to facilitate receiving a cable between the fingers by providing for the fingers to resiliently bend away from one another, to achieve a reliable and long-lasting environmental seal for cables and splices.

* * * * *